US012565242B2

(12) United States Patent (10) Patent No.: US 12,565,242 B2
Fujiwara et al. (45) Date of Patent: Mar. 3, 2026

(54) CONTROL DEVICE, CONTROL METHOD, AND STORAGE MEDIUM

(71) Applicant: HONDA MOTOR CO., LTD., Tokyo (JP)

(72) Inventors: Tatsuro Fujiwara, Tokyo (JP); Mizuki Owada, Tokyo (JP); Jumpei Noguchi, Tokyo (JP); Gaku Shimamoto, Tokyo (JP); Ayumu Mitomo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 18/585,531

(22) Filed: Feb. 23, 2024

(65) Prior Publication Data

US 2024/0326875 A1 Oct. 3, 2024

(30) Foreign Application Priority Data

Mar. 31, 2023 (CN) .......................... 202310346066.5

(51) Int. Cl.
*B60W 60/00* (2020.01)
*B60W 50/08* (2020.01)
*B60W 50/14* (2020.01)

(52) U.S. Cl.
CPC ...... *B60W 60/0053* (2020.02); *B60W 50/082* (2013.01); *B60W 50/14* (2013.01)

(58) Field of Classification Search
CPC ........... B60W 60/0053; B60W 50/082; B60W 50/14; B62D 15/0285
See application file for complete search history.

(56) References Cited

U.S. PATENT DOCUMENTS

| 2021/0155231 | A1 | 5/2021 | Shimamoto et al. |
| 2022/0004185 | A1 | 1/2022 | Kim |
| 2022/0135080 | A1* | 5/2022 | Hamada ................ B60W 30/06 |
| | | | 701/23 |

FOREIGN PATENT DOCUMENTS

| JP | 2008-015839 A | 1/2008 |
| JP | 2015-120403 A | 7/2015 |

(Continued)

OTHER PUBLICATIONS

Merged PE2E English Translation and Foreign KR 20190051637 A (Year: 2019).*

(Continued)

*Primary Examiner* — James J Lee
*Assistant Examiner* — Andrew Sang Kim
(74) *Attorney, Agent, or Firm* — Paratus Law Group, PLLC

(57) ABSTRACT

A control device includes: a circuit configured to receive an instruction from outside a moving body by a terminal of a user of the moving body; a movement controller configured to perform movement control of the moving body based on the instruction and stop the movement control based on a stop operation for the movement control; and a drive controller configured to set an automatic stop mode in which driving of the moving body is automatically stopped based on completion of the movement control. The drive controller enables the automatic stop mode when the moving body is in a state of waiting to receive the instruction, and keeps the automatic stop mode enabled until the driving of the moving body is stopped, and the movement controller receives the stop operation when the automatic stop mode is disabled and receives no stop operation when the automatic stop mode is enabled.

11 Claims, 14 Drawing Sheets

90

(56) References Cited

FOREIGN PATENT DOCUMENTS

| | | | |
|----|----------------|---|--------|
| JP | 2018-131201 | A | 8/2018 |
| JP | 2021-079881 | A | 5/2021 |
| JP | 2023-114501 | A | 8/2023 |

OTHER PUBLICATIONS

Merged PE2E English Translation and Foreign CN113119954A (Year: 2021).*
Jun. 24, 2025, translation of Japanese Office Action issued for related JP Application No. 2024-020138.

* cited by examiner

REMOTE PARKING READY

CONTROL DEVICE, CONTROL METHOD, AND STORAGE MEDIUM

CROSS-REFERENCE RELATED APPLICATIONS

This application is based on and claims priority under 35 USC 119 from Chinese Patent Application No. 202310346066.5 filed on Mar. 31, 2023, the contents of which are incorporated herein by reference.

TECHNICAL FIELD

The present disclosure relates to a control device, a control method, and a control program.

BACKGROUND

In recent years, efforts have been actively made to provide access to a sustainable transportation system in consideration of vulnerable people among traffic participants.

In order to implement the above, focus has been placed on research and development on further improving safety and convenience of traffic by research and development related to driving assistance techniques.

The related art discloses a remote parking system that remotely operates a vehicle using a smartphone to park the vehicle in a designated prescribed parking space or to cause the vehicle to exit from a parking space. Also, the related art discloses a configuration in a remote parking system, which includes an automatic stop mode in which driving of the vehicle is stopped (ignition is turned off) from the system side when the remote parking is completed.

Japanese Patent Application Laid-Open Publication No. 2021-79881 (hereinafter, referred to as Patent Literature 1) discloses a vehicle control device that, when an occupant alights from a vehicle in a state in which a shift position is switched to a first position (P range) after an automatic parking instruction is given, executes control so as not to turn off a power supply of the vehicle in order to enable remote control after the occupant alights from the vehicle.

It is conceivable to adopt a specification in which, for example, the automatic stop mode is freely switchable between enabled and disabled by a user operation. However, in the specification, remote parking may be executed while the automatic stop mode remains disabled. In this case, driving of the vehicle would not be automatically stopped after the remote parking is completed, and thus a user needs to stop the driving of the vehicle, which increases a burden on the user. When the user forgets to stop the driving of the vehicle, an accident such as carbon monoxide poisoning may occur.

On the other hand, it is also conceivable to adopt a specification in which the automatic stop mode is kept enabled until the driving of the vehicle is stopped after the vehicle is in a state of waiting to receive a remote parking instruction, that is, a specification in which the automatic stop mode cannot be freely disabled by the user operation.

However, in the specification, the automatic stop mode is kept enabled when a stop operation for the remote parking is executed after the vehicle is in the state of waiting to receive the remote parking instruction and the automatic stop mode is enabled. Accordingly, when the user performs a normal driving operation, for example, the automatic stop mode may unintentionally stop the driving of the vehicle. In order to avoid this, it is conceivable to receive no driving operation or the like when the stop operation for the remote parking is executed after the automatic stop mode is enabled.

In this case, however, in order to execute the driving operation or the like, it is necessary to restart the vehicle to disable the automatic stop mode, which increases the burden on the user. Patent Literature 1 does not disclose a device to solve such a problem.

The present disclosure relates to providing a control device for a moving body, a control method, and a control program, which can reduce a burden on a user. This contributes to development of a sustainable transportation system.

SUMMARY

A first aspect of the present disclosure relates to a control device for a moving body, the device including:

a reception circuit configured to receive a movement control execution instruction from outside the moving body by a terminal of a user of the moving body;

a movement controller configured to perform movement control of the moving body based on the movement control execution instruction and stop the movement control based on a stop operation for the movement control; and a drive controller configured to set an automatic stop mode in which driving of the moving body is automatically stopped based on completion of the movement control, in which the drive controller enables the automatic stop mode when the moving body is in a state of waiting to receive the movement control execution instruction, and keeps the automatic stop mode enabled until the driving of the moving body is stopped, and the movement controller receives the stop operation when the automatic stop mode is disabled and receives no stop operation when the automatic stop mode is enabled.

A second aspect of the present disclosure relates to a control method by a control device, in which the control device is configured to receive a movement control execution instruction from outside a moving body by a terminal of a user of the moving body, perform movement control of the moving body based on the movement control execution instruction and stop the movement control based on a stop operation for the movement control, and set an automatic stop mode in which driving of the moving body is automatically stopped based on completion of the movement control, and the method includes:

enabling the automatic stop mode when the moving body is in a state of waiting to receive the movement control execution instruction, and keeping the automatic stop mode enabled until the driving of the moving body is stopped; and receiving the stop operation when the automatic stop mode is disabled and receiving no stop operation when the automatic stop mode is enabled.

A third aspect of the present disclosure relates to computer-readable non-transitory storage medium storing a control program for causing a control device to execute a process, in which the control device is configured to receive a movement control execution instruction from outside a moving body by a terminal of a user of the moving body, perform movement control of the moving body based on the movement control execution instruction and stop the movement control based on a stop operation for the movement control, and set an automatic stop mode in which driving of the moving body is automatically stopped based on completion of the movement control, and the process includes:

enabling the automatic stop mode when the moving body is in a state of waiting to receive the movement control execution instruction, and keep the automatic stop mode enabled until the driving of the moving body is stopped; and receiving the stop operation when the automatic stop mode is disabled and receive no stop operation when the automatic stop mode is enabled.

Exemplary embodiments of the present invention will be described in detail based on the following figures, wherein.

Figure 5:
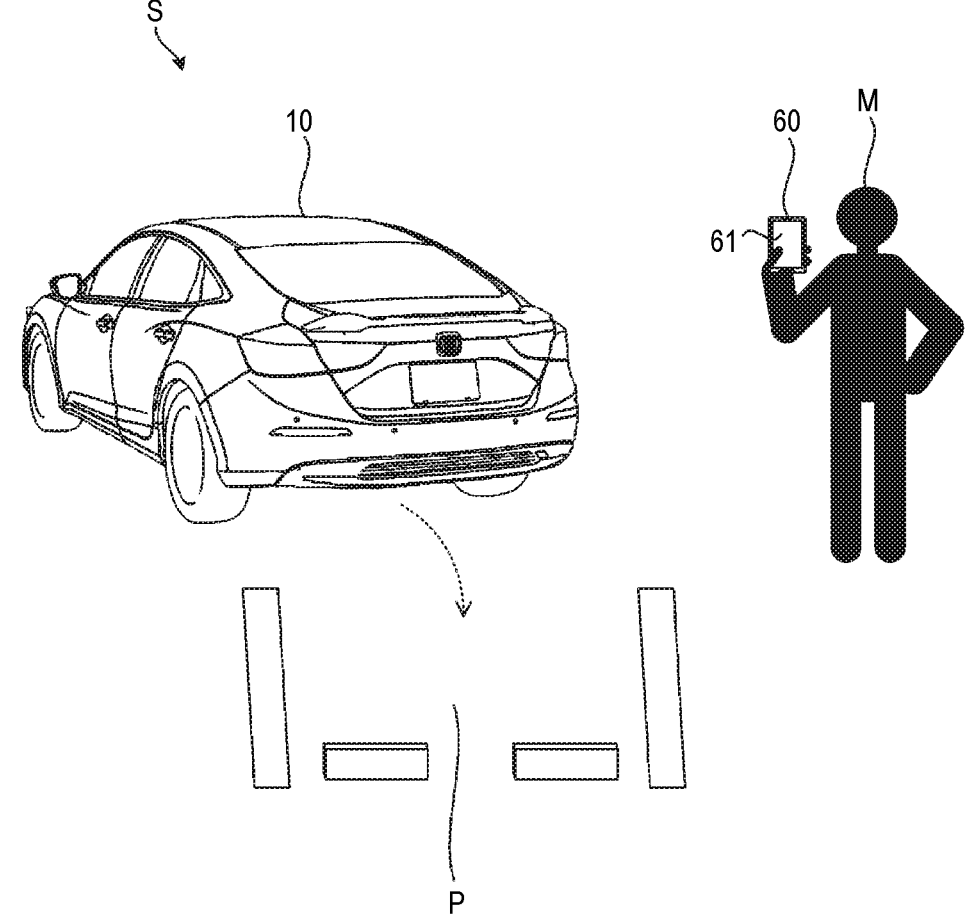
Figure 6:
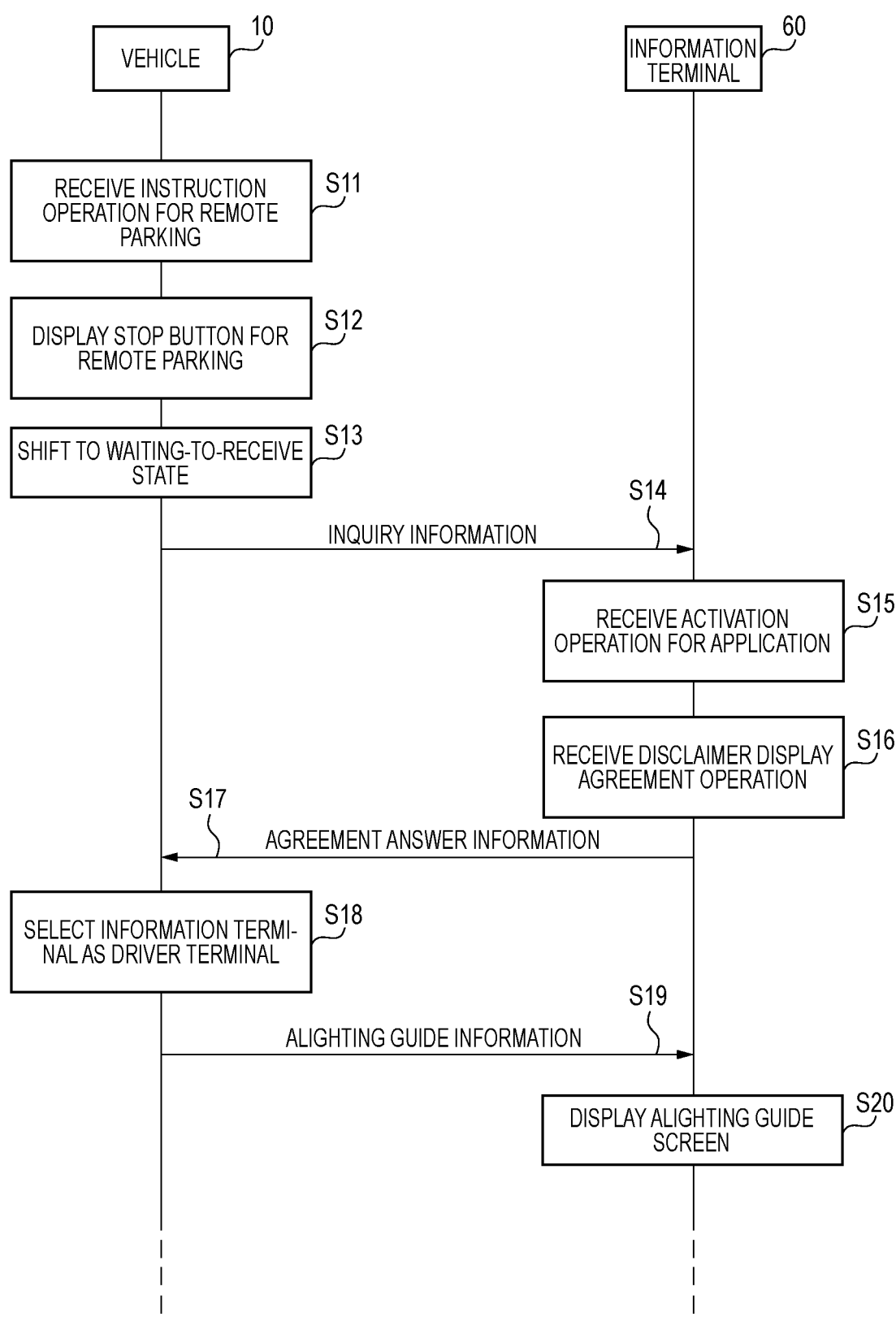
Figure 7:
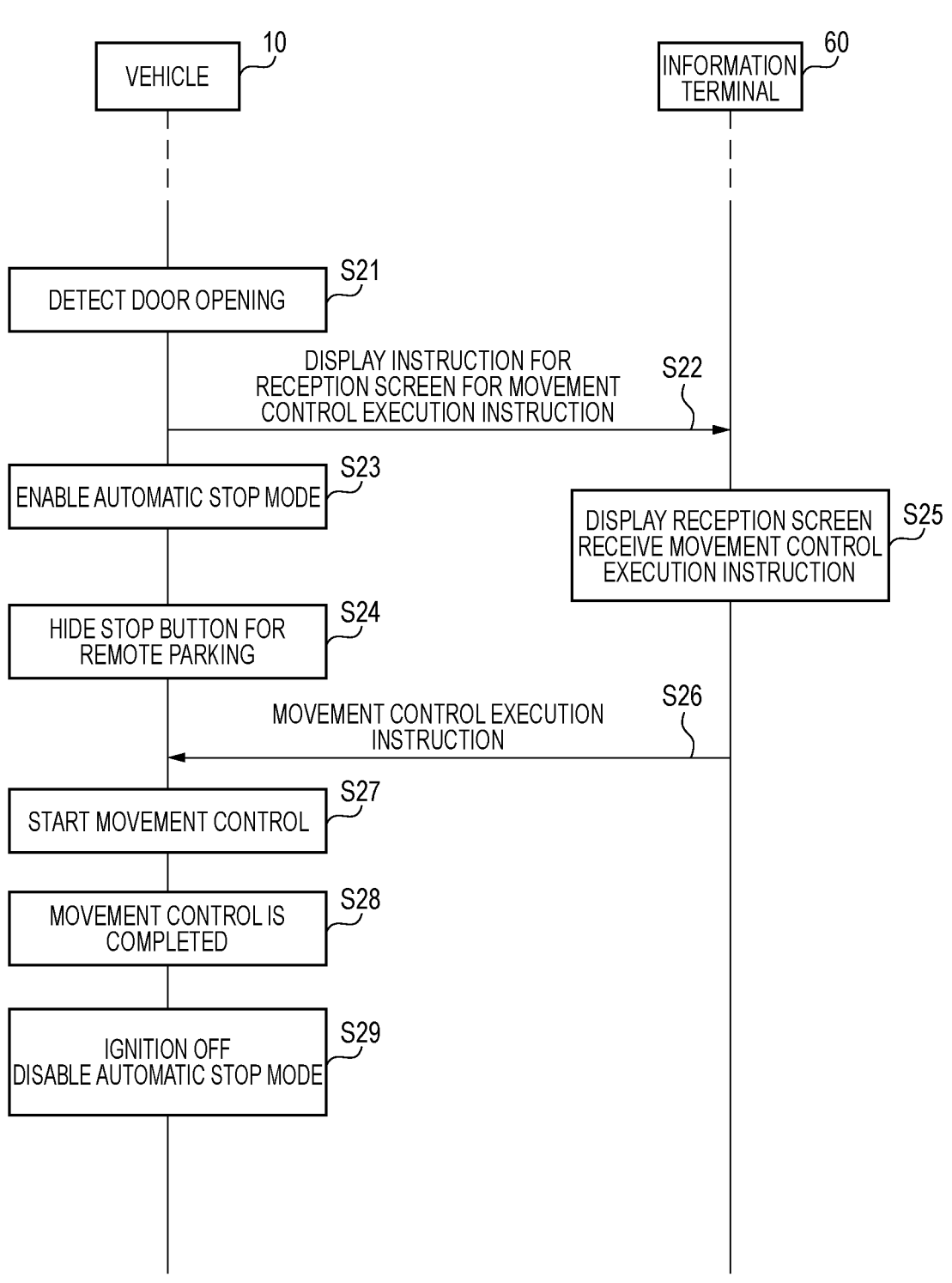
Figure 8:
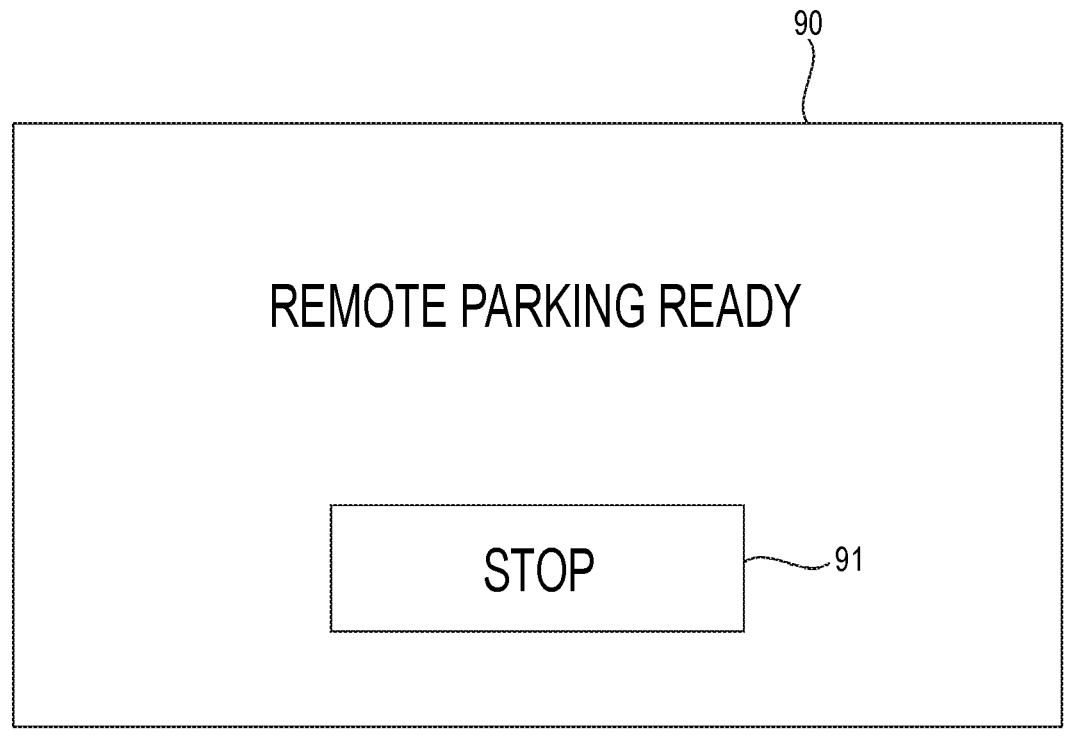
Figure 9:
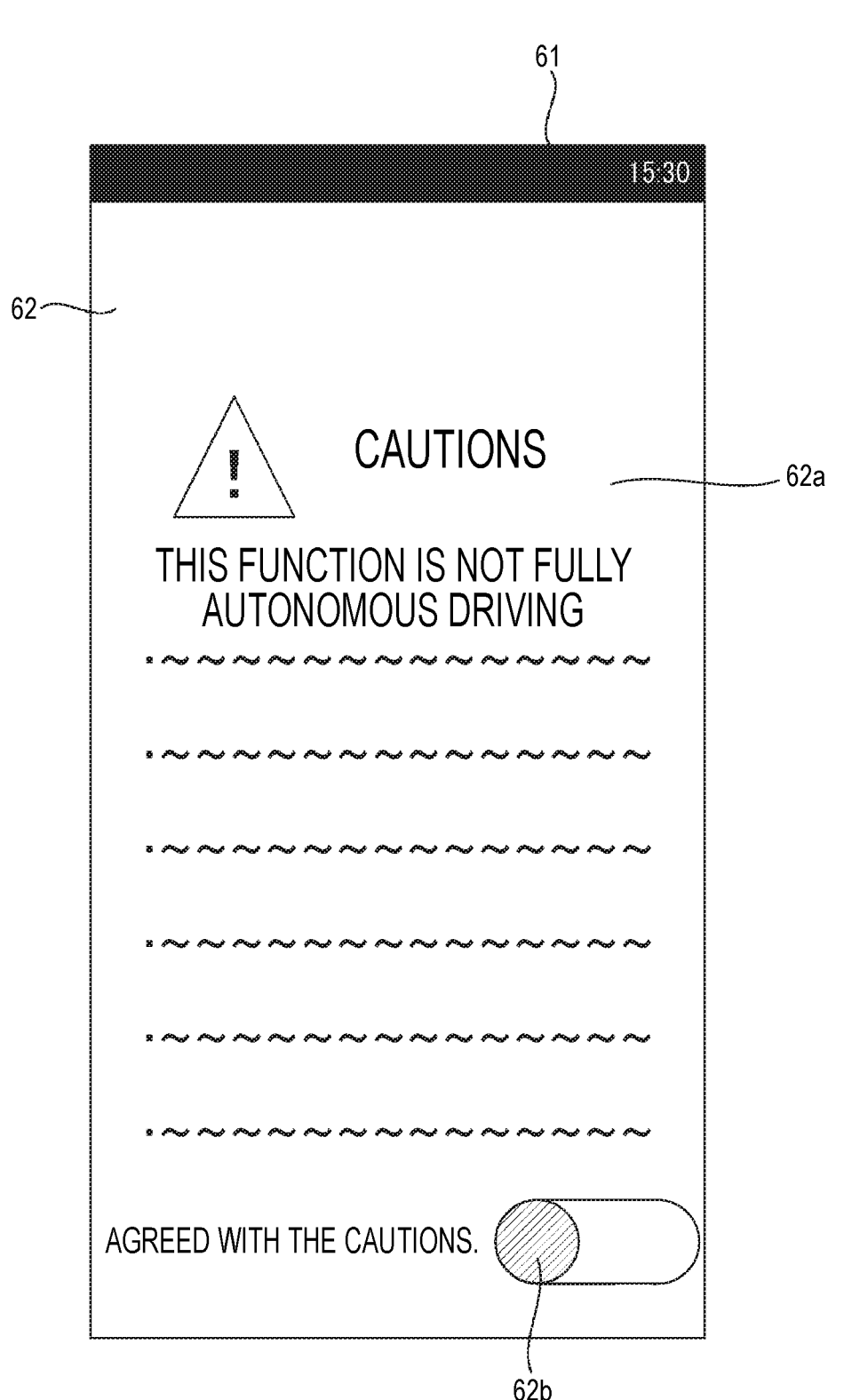
Figure 10:
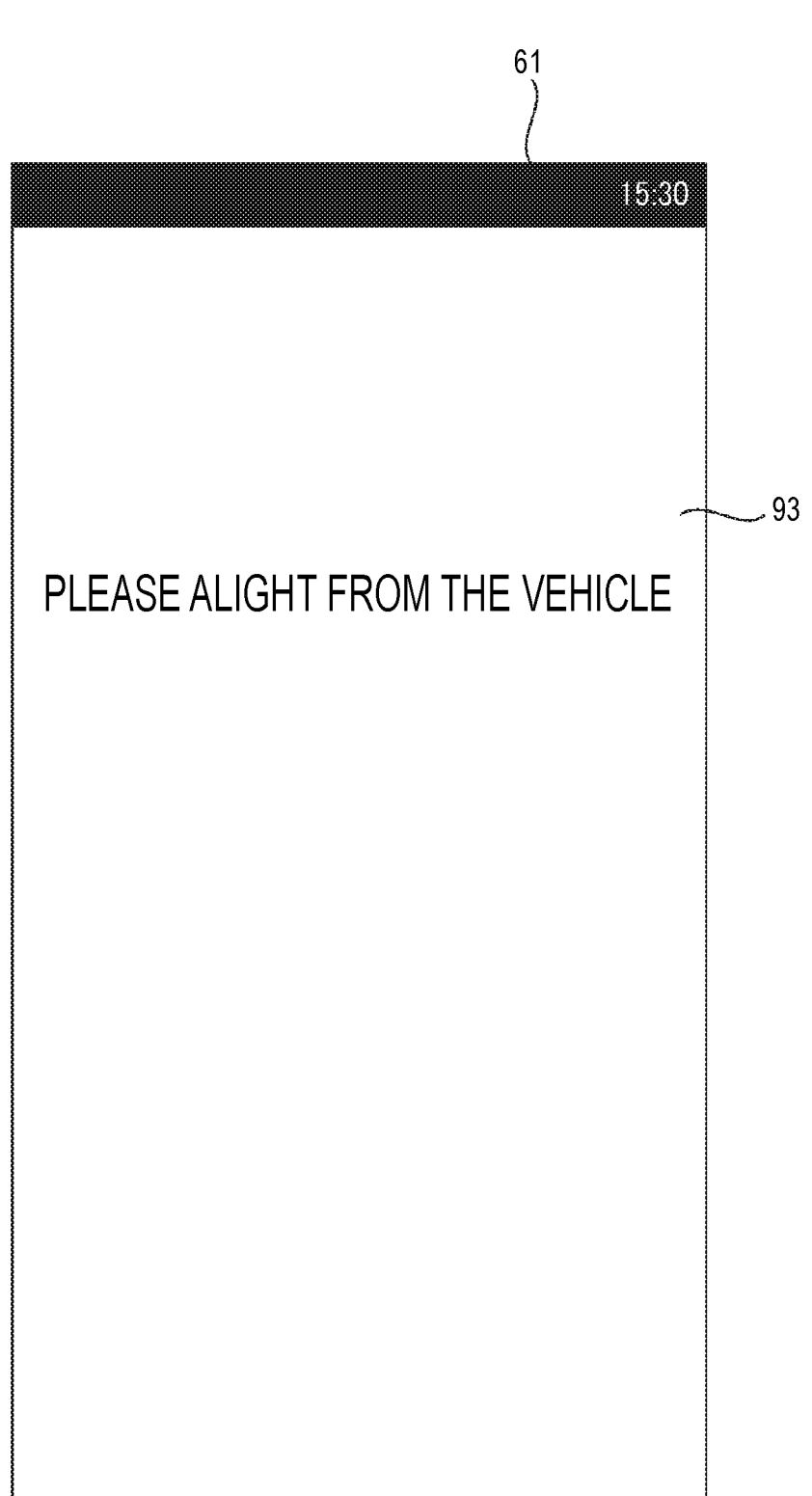
Figure 12:
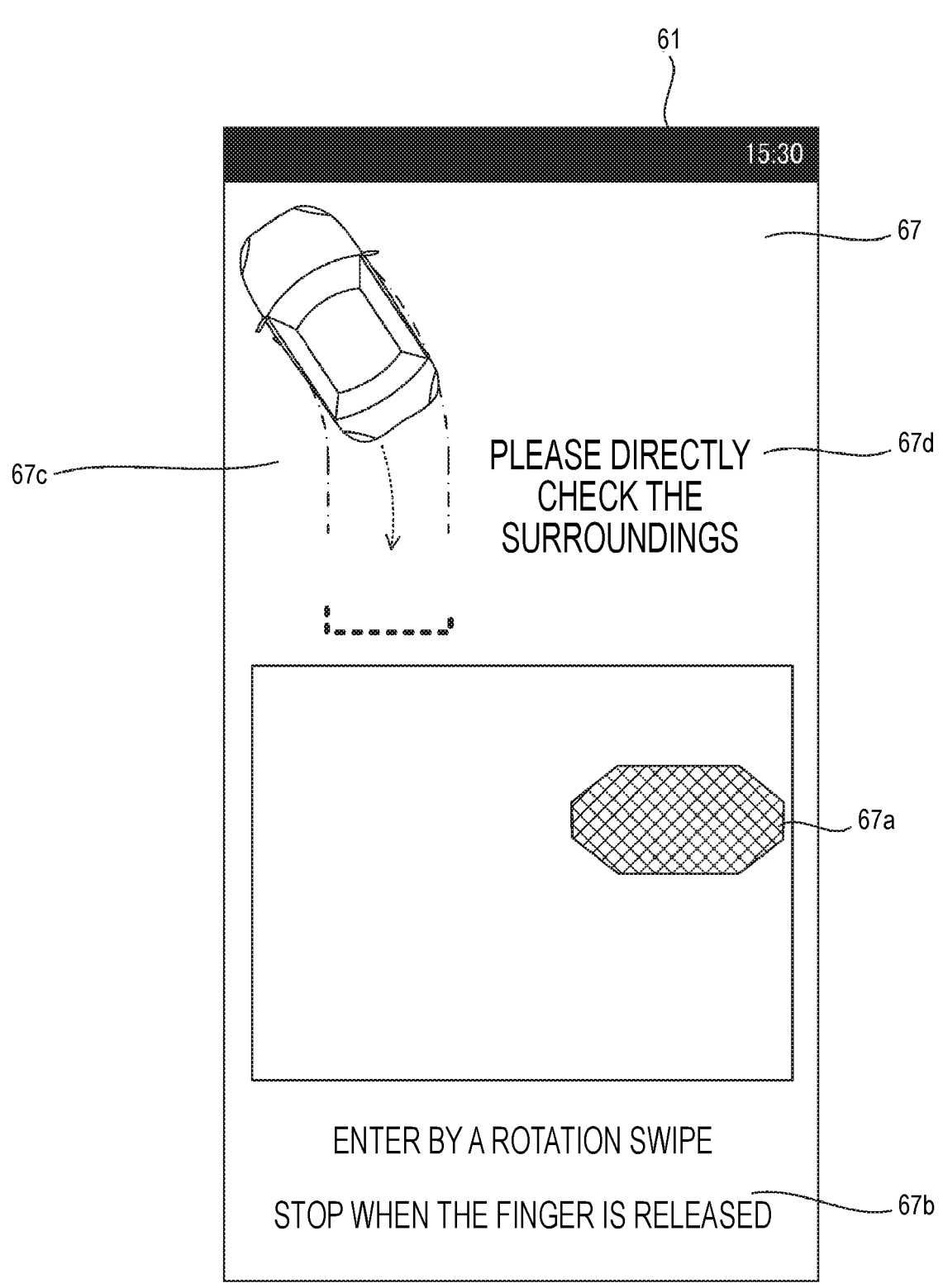
Figure 13:
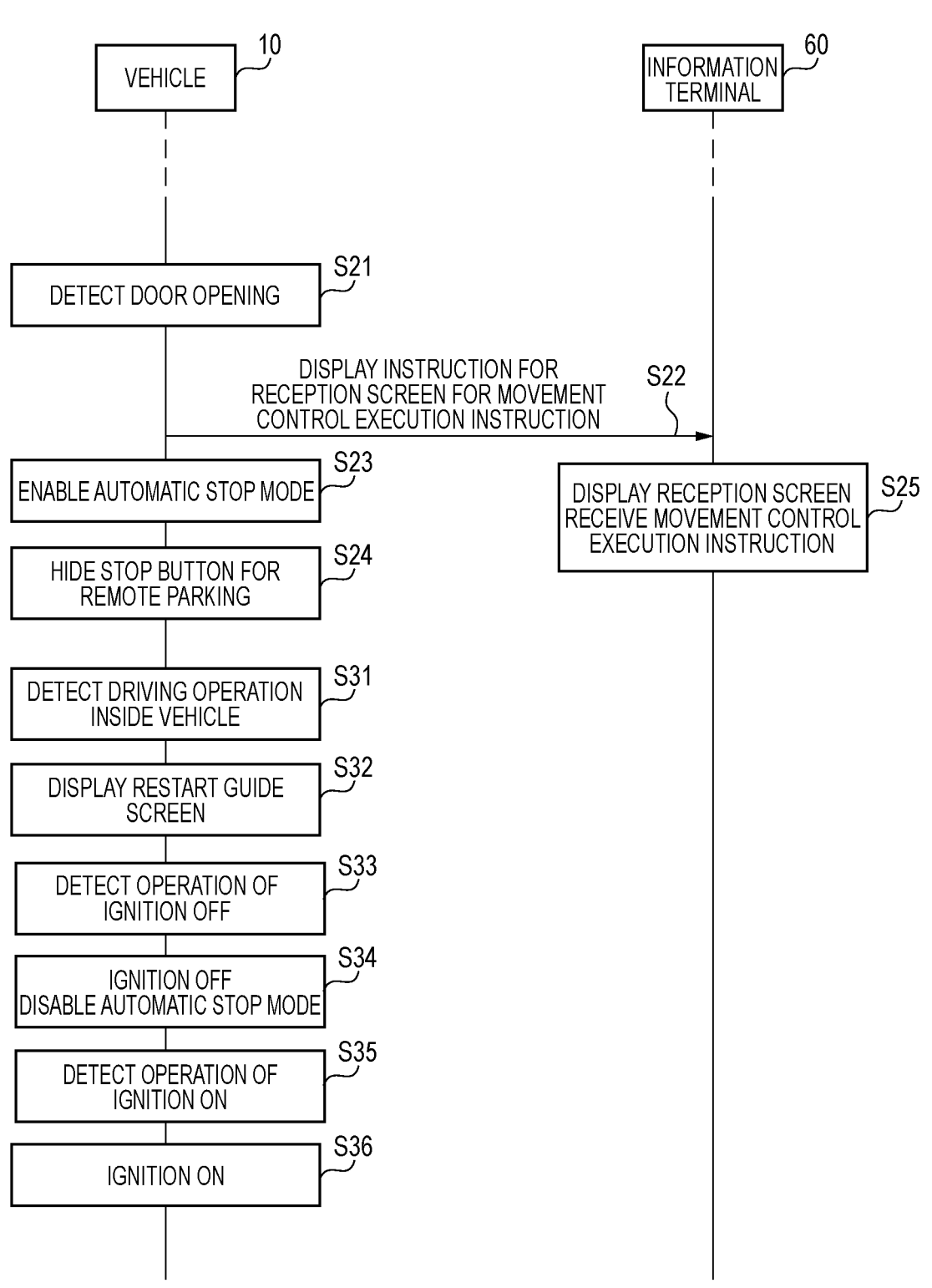
Figure 14:
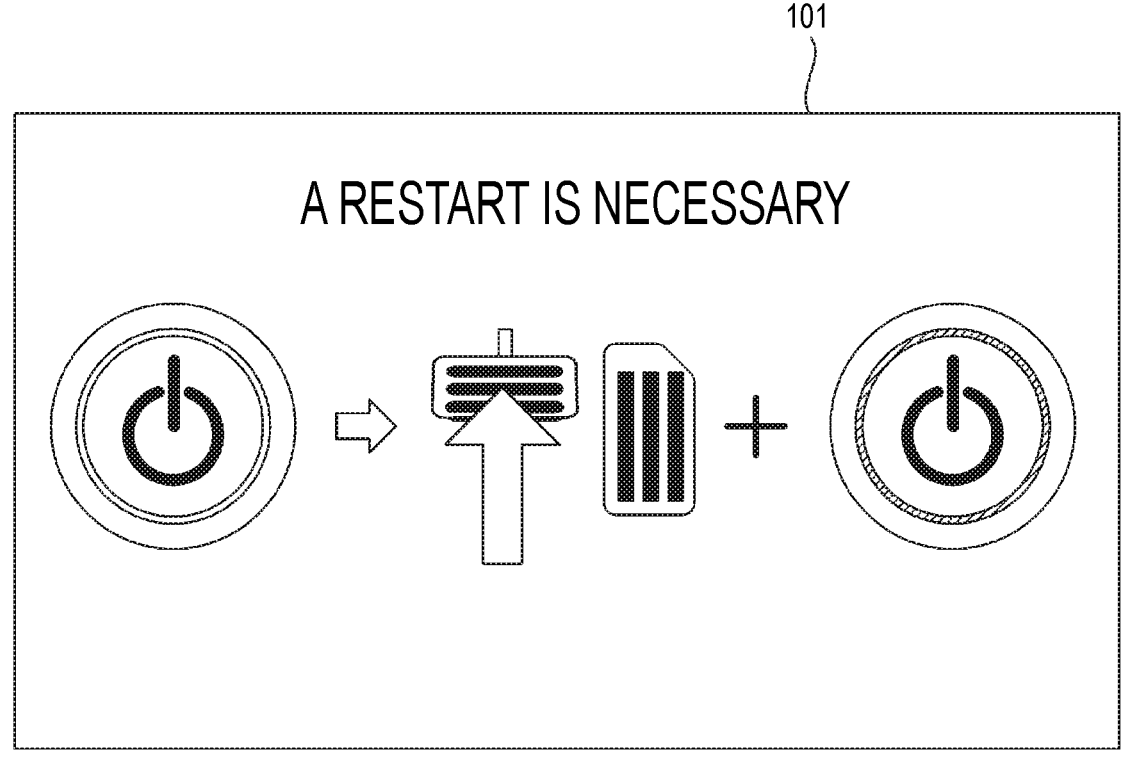
Figure 15:
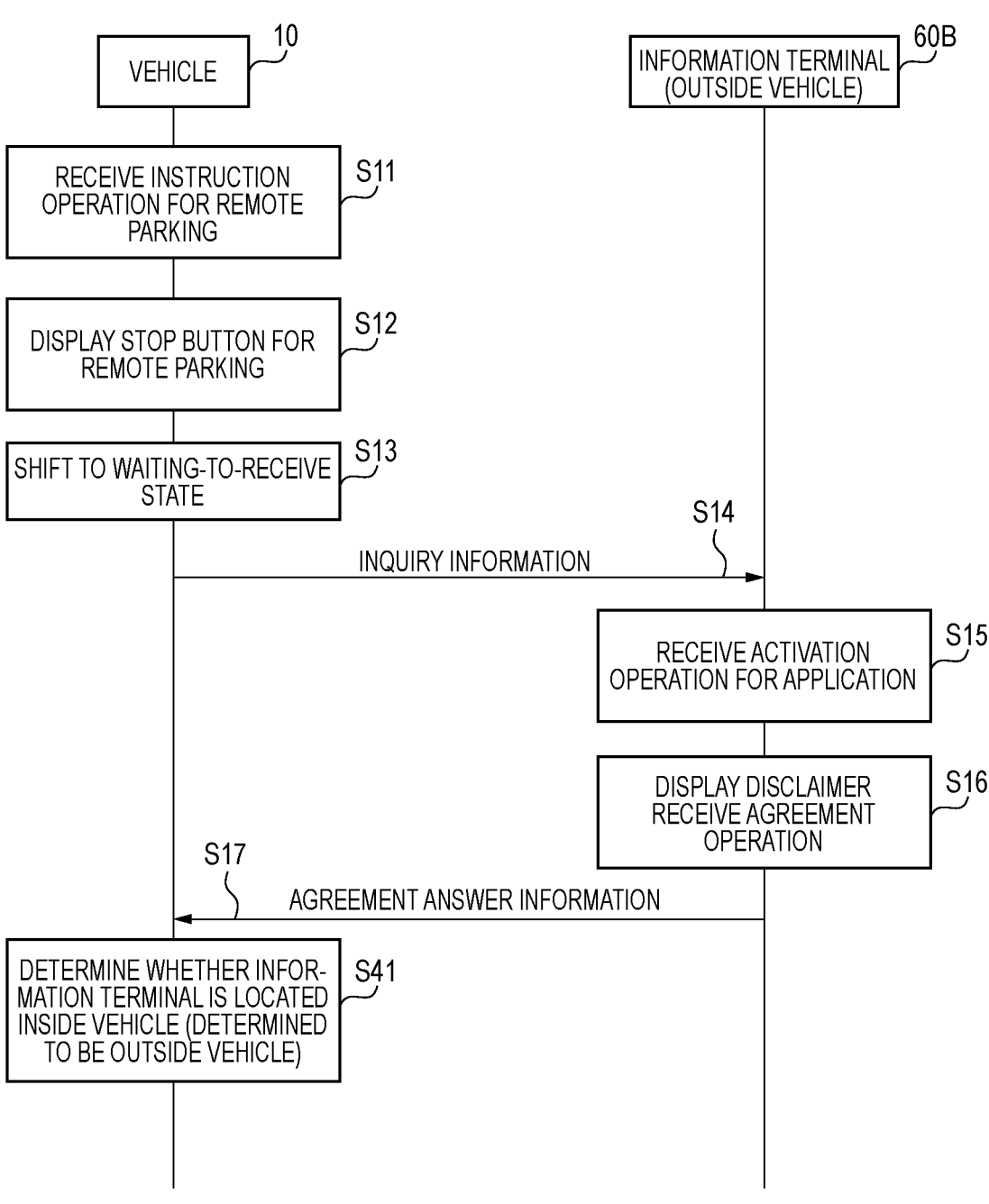
Figure 16:
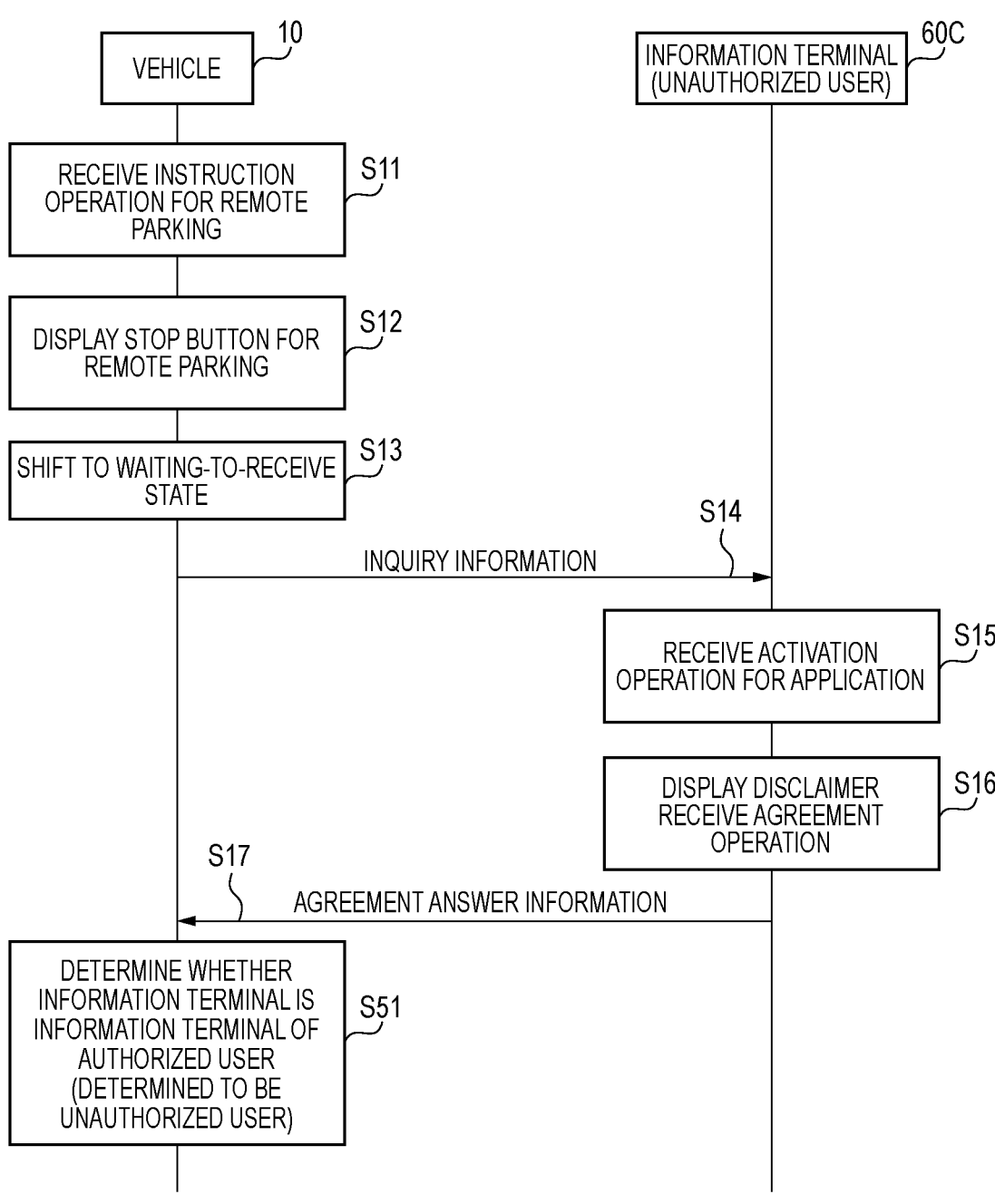

FIG. 5 shows an example of a state in which movement of the vehicle 10 is controlled using an information terminal 60 from outside the vehicle 10;

FIG. 6 is a first sequence diagram showing a first operation example of the vehicle 10 and the information terminal 60;

FIG. 7 is a second sequence diagram showing the first operation example of the vehicle 10 and the information terminal 60;

FIG. 8 shows an example of display of a stop button 91 on a navigation screen 90;

FIG. 9 shows an example of a disclaimer screen;

FIG. 10 shows an example of an alighting notification screen for prompting a user to alight from the vehicle;

Figure 11:
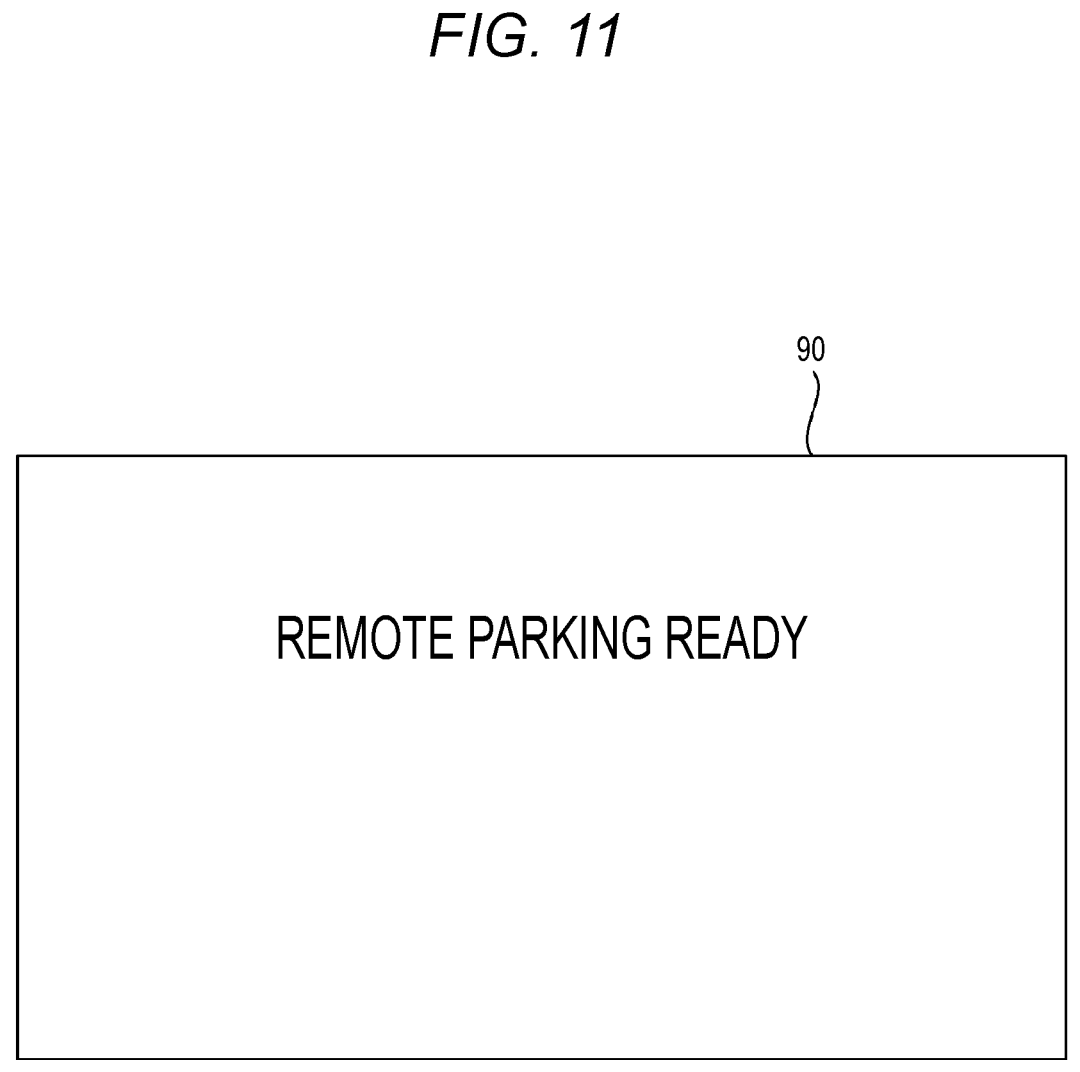

FIG. 11 shows an example of the navigation screen 90 on which the stop button 91 is hidden;

FIG. 12 shows an example of a reception screen for a movement control execution instruction;

FIG. 13 is a sequence diagram showing a second operation example of the vehicle 10 and the information terminal 60;

FIG. 14 shows an example of a restart guide screen;

FIG. 15 is a sequence diagram showing a first modification of the vehicle 10 and the information terminal 60; and FIG. 16 is a sequence diagram showing a second modification of the vehicle 10 and the information terminal 60.

DESCRIPTION OF EMBODIMENTS

Hereinafter, an embodiment of a control device of the present disclosure will be described with reference to the accompanying drawings. The drawings are viewed from directions of reference numerals. In order to simplify and clarify the description in the present specification or the like, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

Vehicle 10 on Which Control Device According to Present Disclosure Is Mounted

Figure 1:
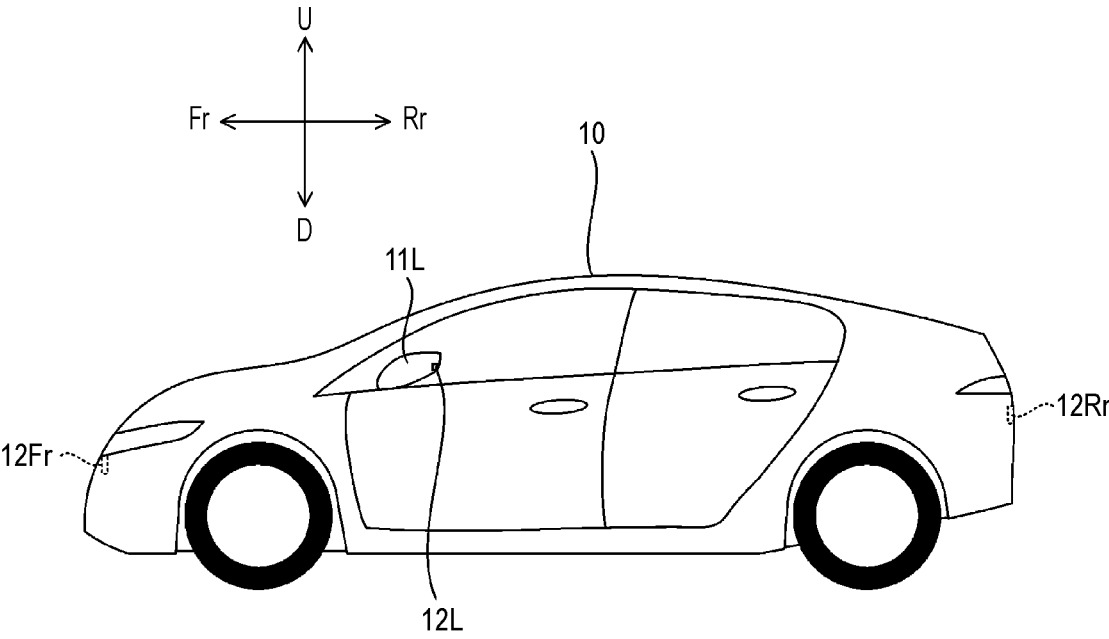
FIG. 1 is a side view of a vehicle 10 on which a control device according to the present disclosure is mounted.
Figure 2:
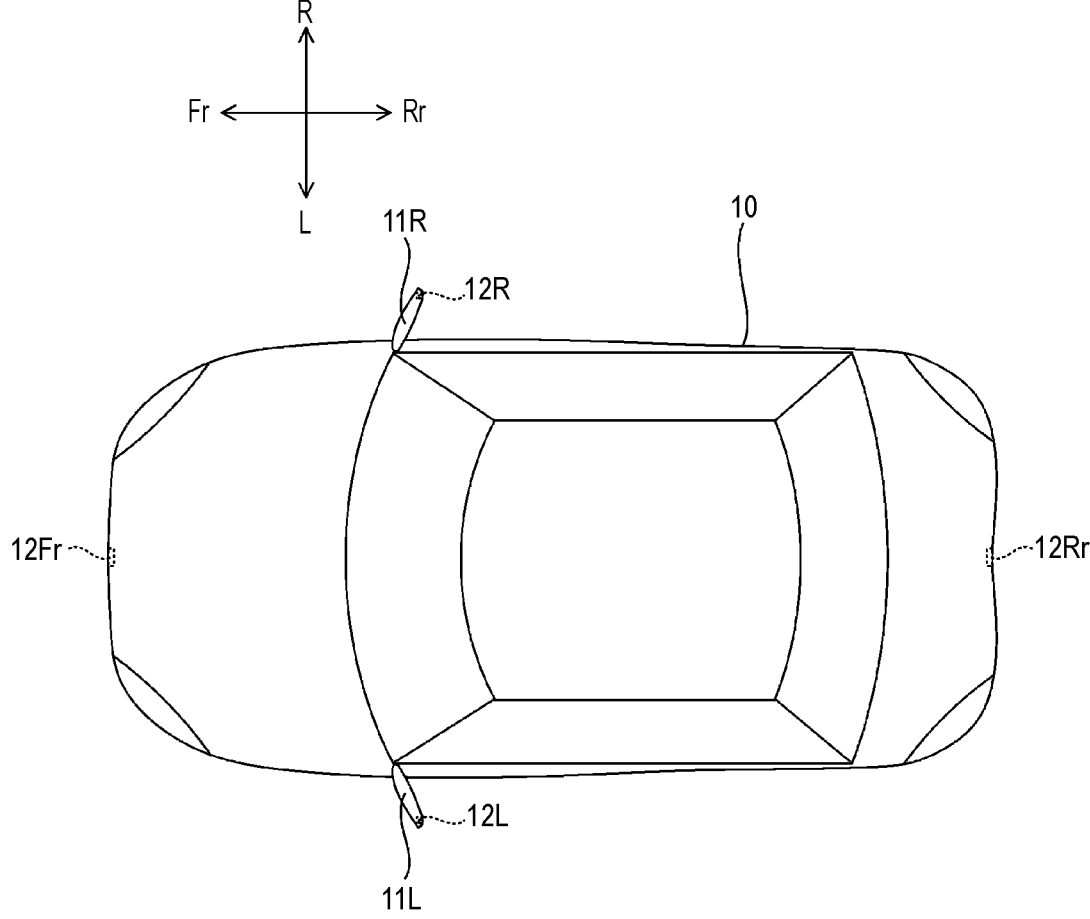
FIG. 2 is a top view of the vehicle 10 shown in FIG. 1.

FIG. 1 is a side view of the vehicle 10 on which the control device according to the present disclosure is mounted. FIG. 2 is a top view of the vehicle 10 shown in FIG. 1. The vehicle 10 is an example of a moving body of the present disclosure.

The vehicle 10 is an automobile including a drive source (not shown) and wheels including drive wheels driven by power of the drive source and steerable steered wheels. In the present embodiment, the vehicle 10 is a four-wheeled automobile having a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or a combination of an electric motor and an internal combustion engine. The drive source of the vehicle 10 may drive the pair of left and right front wheels, the pair of left and right rear wheels, or four wheels including the pair of left and right front wheels and the pair of left and right rear wheels. The front wheels and the rear wheels may all be steerable steered wheels, or the front wheels or the rear wheels may be steerable steered wheels.

The vehicle 10 further includes side mirrors 11L and 11R. The side mirrors 11L and 11R are mirrors (back mirrors) provided on outer sides of front seat doors of the vehicle 10 for the driver to check the rear side and rear lateral sides. The side mirrors 11L and 11R are fixed to a body of the vehicle 10 by rotation shafts extending in a vertical direction, and can be opened and closed by rotating about the rotation shafts.

The vehicle 10 further includes a front camera 12Fr, a rear camera 12Rr, a left side camera 12L, and a right side camera 12R. The front camera 12Fr is a digital camera that is provided on the front side of the vehicle 10 and captures an image of the front side of the vehicle 10. The rear camera 12Rr is a digital camera that is provided on the rear side of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

Internal Configuration of Vehicle 10

Figure 3:
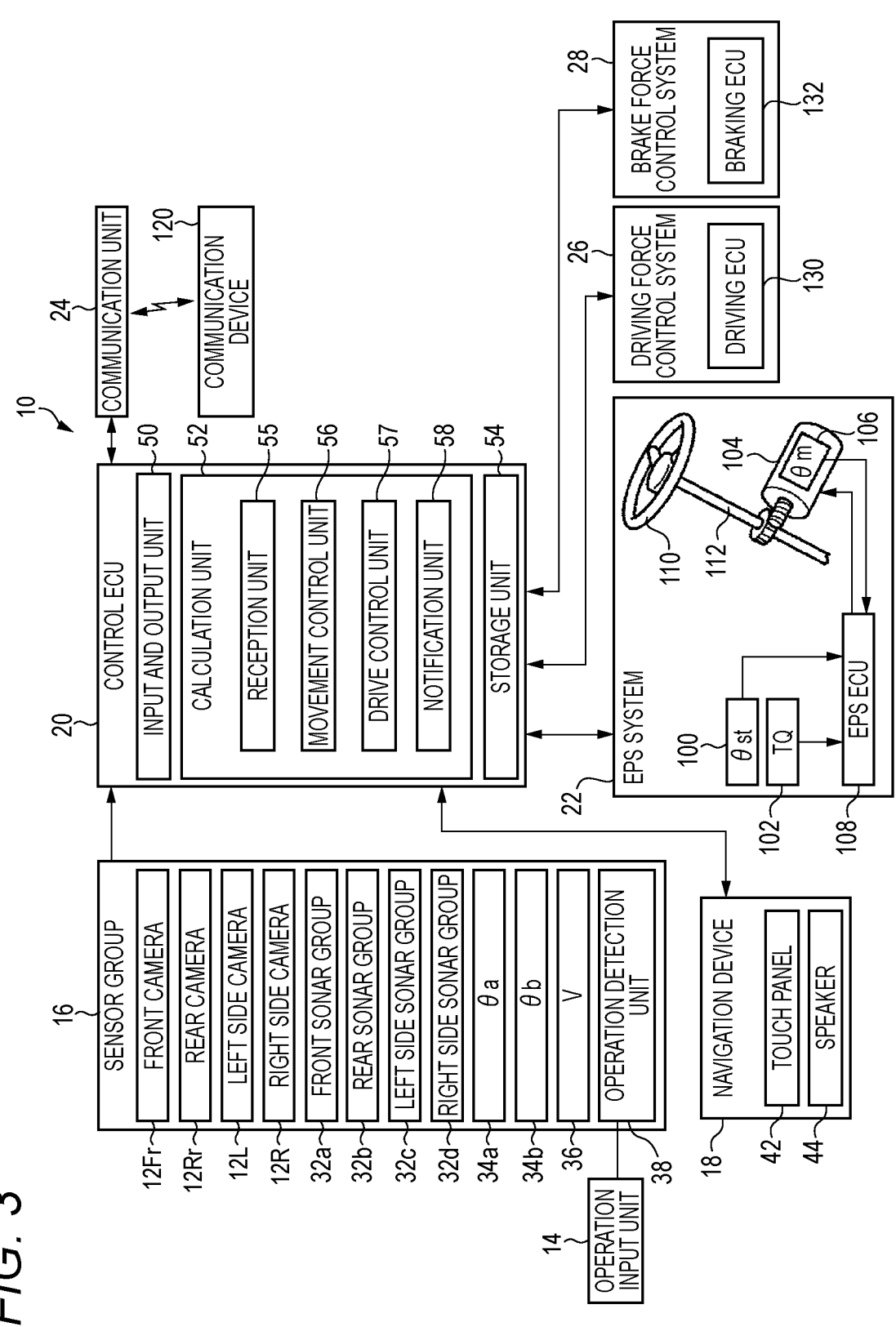
FIG. 3 is a block diagram showing an example of an internal configuration of the vehicle 10 shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a brake force control system 28. The control ECU 20 is an example of the control device of the present disclosure.

The sensor group 16 obtains various detection values used for control executed by the control ECU 20. The sensor group 16 includes the front camera 12Fr, the rear camera 12Rr, the left side camera 12L, and the right side camera 12R. The sensor group 16 includes a front sonar group 32a, a rear sonar group 32b, a left side sonar group 32c, and a right side sonar group 32d. The sensor group 16 includes wheel sensors 34a and 34b, a vehicle speed sensor 36, and an operation detection unit 38.

The front camera 12Fr, the rear camera 12Rr, the left side camera 12L, and the right side camera 12R obtain recognition data (for example, surrounding images) for recognizing external environment of the vehicle 10 by capturing images of surroundings of the vehicle 10. The surrounding images captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image.

The front sonar group 32*a*, the rear sonar group 32*b*, the left side sonar group 32*c*, and the right side sonar group 32*d* emit sound waves to the surroundings of the vehicle 10, and receive reflected sounds from other objects. The front sonar group 32*a* includes, for example, four sonars. The sonars that constitute the front sonar group 32*a* are provided on an obliquely left front side, a front left side, a front right side, and an obliquely right front side of the vehicle 10, respectively. The rear sonar group 32*b* includes, for example, four sonars. The sonars that constitute the rear sonar group 32*b* are provided on an obliquely left rear side, a rear left side, a rear right side, and an obliquely right rear side of the vehicle 10, respectively. The left side sonar group 32*c* includes, for example, two sonars. The sonars that constitute the left side sonar group 32*c* are provided at a left side front portion and a left side rear portion of the vehicle 10, respectively. The right side sonar group 32*d* includes, for example, two sonars. The sonars that constitute the right side sonar group 32*d* are provided at a right side front portion and a right side rear portion of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by a prescribed angle. The detection pulses output from the wheel sensors 34*a* and 34*b* are used to calculate rotation angles and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects an operation content of a user performed using an operation input unit 14, and outputs the detected operation content to the control ECU 20. The operation input unit 14 includes various user interfaces such as a side mirror switch that switches between opened and closed states of the side mirrors 11L and 11R, and a shift lever (a selector lever or a selector).

The navigation device 18 detects a current position of the vehicle 10 by using, for example, a global positioning system (GPS), and guides the user to a path to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various kinds of guide information to the user of the vehicle 10 by a sound.

The touch panel 42 enables input of various commands to the control ECU 20. For example, the user may input a command related to movement assistance of the vehicle 10 via the touch panel 42. The movement assistance includes parking assistance and exit assistance of the vehicle 10. The touch panel 42 displays various screens related to control contents of the control ECU 20. For example, the touch panel 42 displays a screen related to movement assistance of the vehicle 10. Specifically, the touch panel 42 displays a parking assistance button for requesting parking assistance of the vehicle 10 and an exit assistance button for requesting exit assistance. The parking assistance button includes an automatic parking button for requesting parking by automatic steering of the control ECU 20, and a support parking button for requesting support while parking the vehicle by an operation of the driver. The exit assistance button includes an automatic exit button for requesting exit by the automatic steering of the control ECU 20, and a support exit button for requesting support while the vehicle is exiting by an operation of the driver. Components other than the touch panel 42, for example, a smartphone or a tablet terminal may also be used as the input device or the display device.

The control ECU 20 includes an input and output unit 50, a calculation unit 52, and a storage unit 54. The calculation unit 52 is implemented by, for example, a central processing unit (CPU). The calculation unit 52 executes various kinds of control by controlling units based on a program stored in the storage unit 54. Further, the calculation unit 52 receives and outputs signals from and to units connected to the control ECU 20 via the input and output unit 50.

The calculation unit 52 includes a reception unit 55 that receives a movement control execution instruction from outside the vehicle 10 by a terminal of the user of the vehicle 10, a movement control unit 56 that executes movement control of the vehicle 10, a drive control unit 57 that drives the vehicle 10 and stops driving the vehicle 10, and a notification unit 58. The reception unit 55 receives the movement control execution instruction from outside the vehicle 10 by communicating with the terminal of the user of the vehicle 10 via the communication unit 24, for example.

The movement control unit 56 executes automatic parking assistance and automatic exit assistance of the vehicle 10 by automatic steering in which a steering wheel 110 is automatically operated under the control of the movement control unit 56. In the automatic parking assistance and the automatic exit assistance, an accelerator pedal (not shown), a brake pedal (not shown), and the operation input unit 14 are automatically operated. The movement control unit 56 performs support parking assistance and support exit assistance when the driver operates the accelerator pedal, the brake pedal, and the operation input unit 14 to manually park the vehicle 10 and manually exit the vehicle 10.

For example, the movement control unit 56 executes automatic parking control for parking the vehicle 10 in a prescribed parking space designated by the user and automatic exit control for the vehicle 10 to exit from the prescribed parking space, based on the recognition data of the external environment of the vehicle 10 obtained by the front camera 12Fr, the rear camera 12Rr, the left side camera 12L, and the right side camera 12R and the designated prescribed parking space.

Specifically, when receiving an operation for shifting to automatic parking control or automatic exit control from the user of the vehicle 10, the movement control unit 56 transmits inquiry information necessary for determining a driver who performs an instruction operation for automatic parking or automatic exit to information terminals surrounding the vehicle 10. Among the information terminals surrounding the vehicle 10, the movement control unit 56 transmits the inquiry information to an information terminal on which an application for executing a movement control execution instruction for the vehicle 10 is activated by a user operation. In addition, the movement control unit 56 receives prescribed answer information from the user in response to the inquiry information, and selects the information terminal that is a transmission source of the initially received answer information as a driver terminal that executes instruction control. The movement control unit 56 executes movement control of the vehicle 10 based on movement control execution instruction information from the driver terminal.

The movement control unit 56 registers a prescribed parking space designated by the user in the storage unit 54 as a designated parking space. The movement control unit 56 registers feature points related to the designated parking space in the storage unit 54 based on the recognition data of the external environment of the vehicle 10 obtained by the front camera 12Fr, the rear camera 12Rr, the left side camera 12L, and the right side camera 12R. The movement control unit 56 executes the automatic parking control for parking the vehicle 10 in the designated parking space and the automatic exit control for the vehicle 10 to exit from the designated parking space based on the recognition data of the external environment of the vehicle 10 and the feature points of the designated parking space designated by the user.

The drive control unit 57 drives the vehicle 10 (for example, turns on an ignition) and stops driving the vehicle 10 (for example, turns off the ignition) according to a user operation (for example, pressing of an ignition button). The drive control unit 57 can set an automatic stop mode in which driving of the vehicle 10 is automatically stopped based on completion of movement control (for example, the above-described automatic parking).

The notification unit 58 gives various notifications to the user of the vehicle 10 by communicating with the terminal of the user of the vehicle 10 via the communication unit 24, for example. Further, the notification unit 58 gives various notifications to the user of the vehicle 10 by controlling the touch panel 42 and the speaker 44 of the navigation device 18, for example.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 coupled to the steering wheel 110, thereby enabling operation assistance to the steering wheel 110 by an occupant and automatic steering during parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 is a base station, a communication device of another vehicle, a smartphone or a tablet terminal carried by the user of the vehicle 10, or the like. The communication unit 24 is an example of a communication unit of the present disclosure. The smartphone and the tablet terminal are examples of an information terminal of the present disclosure.

The driving force control system 26 includes a driving ECU 130. The driving force control system 26 executes driving force control of the vehicle 10. The driving ECU 130 controls a driving force to the vehicle 10 by controlling an engine (not shown) or the like based on an operation to an accelerator pedal (not shown) by the user.

The brake force control system 28 includes a braking ECU 132. The brake force control system 28 executes brake force control of the vehicle 10. The braking ECU 132 controls a brake force to the vehicle 10 by controlling a brake mechanism or the like (not shown) based on an operation on a brake pedal (not shown) by the user.

Hardware Configuration of User Terminal of Vehicle 10

Figure 4:
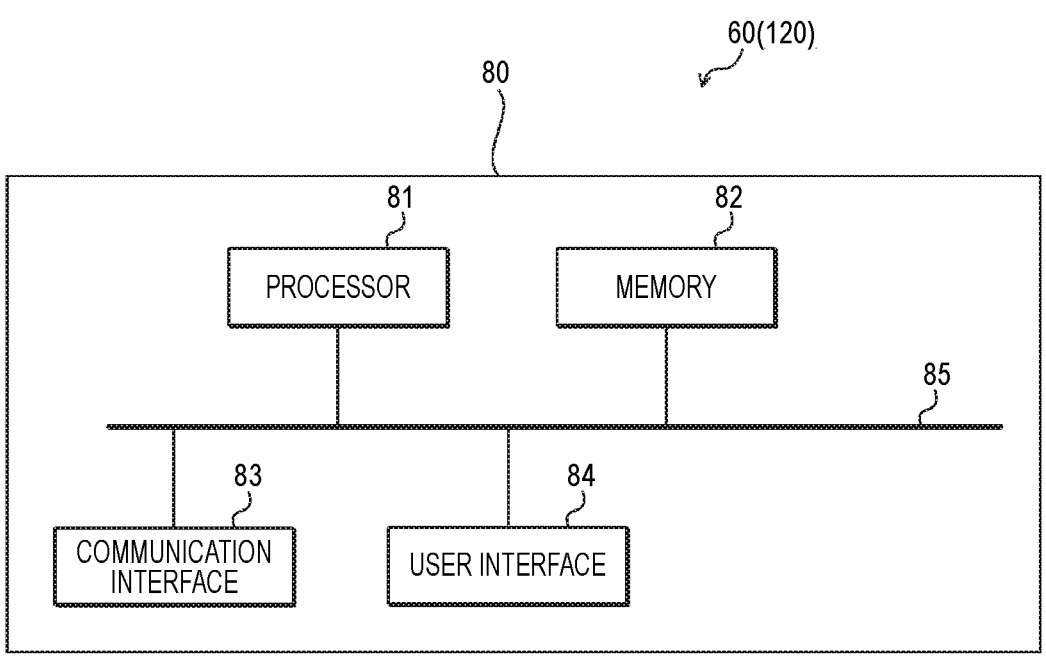
FIG. 4 shows an example of a hardware configuration of a terminal of a user of the vehicle 10.

FIG. 4 shows an example of a hardware configuration of the terminal of the user of the vehicle 10. An information terminal 60 shown in FIG. 4 is an example of the terminal of the user of the vehicle 10. Hardware of the information terminal 60 may be implemented by, for example, an information processing device 80 shown in FIG. 4. The information processing device 80 includes a processor 81, a memory 82, a communication interface 83, and a user interface 84. The processor 81, the memory 82, the communication interface 83, and the user interface 84 are connected by, for example, a bus 85.

The processor 81 is a circuit that performs signal processing, and is, for example, a central processing unit (CPU) that controls the entire information processing device 80. The processor 81 may be implemented by another digital circuit such as a field programmable gate array (FPGA) or a digital signal processor (DSP). The processor 81 may also be implemented by combining a plurality of digital circuits.

The memory 82 includes, for example, a main memory and an auxiliary memory. The main memory is, for example, a random access memory (RAM). The main memory is used as a work area of the processor 81.

The auxiliary memory is a nonvolatile memory such as a magnetic disk, an optical disk, or a flash memory. The auxiliary memory stores various programs for operating the information processing device 80. The programs stored in the auxiliary memory are loaded onto the main memory and executed by the processor 81.

The auxiliary memory may include a portable memory removable from the information processing device 80. Examples of the portable memory include a universal serial bus (USB) flash drive, a memory card such as a secure digital (SD) memory card, and an external hard disk drive.

The communication interface 83 is a communication interface that performs wireless communication with an outside of the information processing device 80 (for example, the communication unit 24 of the vehicle 10). For example, the communication interface 83 includes an ultra wide band (UWB) interface for performing UWB communication with the vehicle 10. The communication interface 83 is controlled by the processor 81.

The user interface 84 includes, for example, an input device that receives an operation input from the user and an output device that outputs information to the user. The input device may be implemented by, for example, a touch panel. The output device may be implemented by, for example, a display and a speaker. The user interface 84 is controlled by the processor 81.

The processor 81 performs movement control for instructing movement of the vehicle 10. For example, the processor 81 performs movement control of the vehicle 10 based on a specific operation of the user on a terminal screen of the information terminal 60. The movement control includes, for example, parking control for automatically parking the vehicle 10 in a prescribed parking space and exit control for the vehicle 10 to automatically exit from a prescribed parking space to a target movement position. The specific operation includes, for example, a slide operation for moving the vehicle 10, and a tap operation for reserving parking and exit plans. The slide operation includes a continuous position instruction operation (for example, a swipe operation), a rotation instruction operation in a prescribed rotation direction (for example, a rotation swipe operation), and the like. The processor 81 further performs control to generate a guide image for prompting the user to perform an instruction operation on the terminal screen of the information terminal 60 and display the generated guide image on the terminal screen.

The processor 81 transmits to the vehicle 10 a parking instruction for automatically parking the vehicle 10 and an exit instruction for the vehicle 10 to automatically exit based on the specific operation on the terminal screen of the information terminal 60. An application capable of controlling the movement of the vehicle 10 by transmitting and receiving information related to the movement control of the vehicle 10 to and from the vehicle 10 is installed in the information terminal 60.

Control by Information Terminal 60

FIG. 5 shows an example of a state in which movement of the vehicle 10 is controlled using the information terminal 60 from outside the vehicle 10. A user M of the vehicle 10 controls a movement control execution instruction to automatically park the vehicle 10 in a parking space P using the information terminal 60 carried by the user M from outside the vehicle 10. The control of the movement control execution instruction includes, for example, control of an exit instruction for the vehicle 10 to automatically exit from the parking space P and control of a parking instruction for automatically parking the vehicle 10 in the parking space P. The example shown in FIG. 5 shows a state in which a parking instruction is given to the vehicle 10.

When a terminal screen 61 of the information terminal 60 is touch-operated by the user M, the information terminal 60 transmits an instruction signal instructing automatic parking of the vehicle 10 to the vehicle 10 by wireless communication. Examples of the wireless communication with the vehicle 10 include UWB, Bluetooth low energy (BLE: registered trademark), and near field communication (NFC: registered trademark). The vehicle 10 receives the instruction signal transmitted from the information terminal 60 through the communication unit 24. The movement control unit 56 of the vehicle 10 performs automatic parking control of the vehicle 10 according to the received instruction signal.

First Operation Example

FIGS. 6 and 7 are sequence diagrams showing a first operation example of the vehicle 10 and the information terminal 60. Each operation of the vehicle 10 is executed under the control of the control ECU 20.

First, the vehicle 10 receives, from the user M, an instruction operation for remote parking to park the vehicle 10 in the parking space P under the automatic parking control (step S11). The instruction operation for remote parking is an operation for setting a state of the vehicle 10 to a state in which the vehicle 10 can be parked by the automatic parking control. The instruction operation is received by touching an automatic parking button (not shown) by the user M in the vehicle 10. The automatic parking button may be, for example, a touch button displayed on the touch panel 42 of the navigation device 18, or a mechanical vehicle switch.

Next, the vehicle 10 displays a remote parking stop button on the touch panel 42 of the navigation device 18 (step S12). For example, the vehicle 10 displays a navigation screen 90 shown in FIG. 8 on the touch panel 42. The navigation screen 90 includes a message "remote parking is ready" and a stop button 91. When the stop button 91 is operated (for example, a touch operation), the vehicle 10 stops the remote parking in which the instruction operation is received in step S11.

Next, the vehicle 10 shifts to a waiting-to-receive state to receive a signal from the information terminal 60 (step S13). The vehicle 10 transmits inquiry information related to automatic parking to an information terminal (for example, the information terminal 60 carried by the user M) surrounding the vehicle 10 (step S14). The information terminal 60 surrounding the vehicle 10 is, for example, an information terminal whose communication quality with the communication unit 24 of the vehicle 10 is equal to or higher than a certain level. Specifically, the information terminal 60 is a smartphone or the like carried by the user M within 5 to 10 m of the vehicle 10. The inquiry information related to automatic parking is, for example, information for inquiring of the user M whether to agree with cautions stipulated regarding automatic parking.

The information terminal 60 receives an activation operation of the user M who activates an application for executing a movement control execution instruction for the vehicle 10 (step S15). The information terminal 60 displays a disclaimer (cautions stipulated regarding automatic parking) on the terminal screen 61, and receives an agreement operation of the user M that agrees with the disclaimer (step S16). An example of a screen of the disclaimer is a disclaimer screen 62 shown in FIG. 9.

The disclaimer screen 62 includes an agreement statement 62a expressing agreement contents, for example, "CAUTIONS: THIS FUNCTION IS NOT FULLY AUTONOMOUS DRIVING." The disclaimer screen 62 further includes an agree button 62b operated by the user M when the user M agrees with the cautions. When the agree button 62b is swipe-operated (specific operation), the vehicle 10 displays a statement expressing that the driver M agrees with the cautions, such as "AGREED WITH THE CAUTIONS."

After step S16, the information terminal 60 transmits agreement answer information on the user M who agrees with the disclaimer to the vehicle 10 (step S17). The agreement answer information is, for example, information on an answer of agreeing with the cautions regarding the inquired automatic parking. The agreement answer information is an example of a ready instruction for movement control.

Next, the vehicle 10 selects the information terminal that initially transmitted the agreement answer information, that is, the information terminal 60 in this example, as the driver terminal (step S18). The driver terminal is an information terminal that is permitted to control automatic parking of the vehicle 10. Accordingly, the information terminal 60 is in a state of being communicably connected to the vehicle 10 as a driver terminal that can instruct the automatic parking of the vehicle 10.

Next, the vehicle 10 transmits, to the information terminal 60, alighting guide information that instructs display of an alighting guide screen (step S19). Next, the information terminal 60 displays the alighting guide screen for prompting the user M of the information terminal 60 to alight (step S20). An alighting notification screen may be, for example, an alighting notification screen 93 shown in FIG. 10. The alighting notification screen 93 includes an alighting prompting message such as "PLEASE ALIGHT FROM THE VEHICLE". The user M of the information terminal 60 opens a door of the vehicle 10, alights from the vehicle 10, and closes the door of the vehicle 10 according to the alighting notification screen 93.

Next, the vehicle 10 detects door opening of the vehicle 10 (step S21). The door opening here may be opening of the door of the vehicle 10, and may also include opening and then closing of the door of the vehicle 10. Opening and closing of the door of the vehicle 10 is performed by, for example, an operation of the user M. In this case, the detection of the door opening is performed using a sensor or the like that detects the opening and closing of the door. The opening and closing of the door of the vehicle 10 may be automatically performed using an actuator provided in the vehicle 10. In this case, the opening of the door may be detected by determining whether the door of the vehicle 10 is automatically opened or closed.

Next, the vehicle 10 transmits, to the information terminal 60, a display instruction for a reception screen for a movement control execution instruction (step S22). The vehicle 10 enables the automatic stop mode in which the driving of the vehicle 10 is automatically stopped when the automatic parking is completed (step S23), and hides the stop button 91 for the remote parking (step S24). For example, as shown in FIG. 11, the vehicle 10 hides the stop button 91 (see FIG. 8) on the navigation screen 90 displayed on the touch panel 42. Accordingly, the vehicle 10 is in a state of receiving no stop operation for the remote parking.

The information terminal 60 displays the reception screen for a movement control execution instruction on the terminal screen 61, and receives the movement control execution instruction from the user M (step S25). Examples of the reception screen for a movement control execution instruction include a reception screen 67 shown in FIG. 12. The reception screen 67 includes, for example, a movement icon 67a that moves following a touch position of the user M by a rotation swipe operation. The reception screen 67 further includes a guide message 67b for executing automatic parking of the vehicle 10 or temporarily stopping the automatic parking of the vehicle 10, such as "ENTER BY A ROTATION SWIPE" or "STOP WHEN THE FINGER IS RELEASED". The guide message 67b is an example of a notification for prompting the user M to give a movement control execution instruction. The reception screen 67 further displays an execution state image 67c indicating an execution state (a state of movement of the vehicle) of the parking control for the vehicle 10 above an area in which the movement icon 67a is displayed. The reception screen 67 further displays, on a right side of the execution state image 67c, a caution message 67d such as "PLEASE DIRECTLY CHECK THE SURROUNDINGS" for calling caution of the user M who performs the instruction operation. The information terminal 60 may display a screen for guiding the touch operation of the user M before displaying the terminal screen 61.

Next, the information terminal 60 transmits the movement control execution instruction to the vehicle 10 according to the operation of the user M on the reception screen 67 (step S26). For example, the information terminal 60 transmits a movement control execution instruction that instructs movement of the vehicle 10 when receiving the rotation swipe operation of the move icon 67a, and transmits a movement control execution instruction that instructs stop of the vehicle 10 when the rotation swipe operation of the move icon 67a is stopped.

The vehicle 10 executes the movement control (automatic parking) according to the movement control execution instruction transmitted from the information terminal 60 (step S27). When the movement control is completed (step S28), the vehicle 10 turns off the ignition (stops driving)

(step S29). At this time, the vehicle 10 disables the automatic stop mode enabled in step S23.

In this manner, the vehicle 10 enables the automatic stop mode in which the driving of the vehicle 10 is automatically stopped when the automatic parking is completed, and then hides the stop button for the remote parking and is in a state of receiving no stop operation for the remote parking. Accordingly, even in a specification in which the automatic stop mode is kept enabled until the driving of the vehicle 10 is stopped after the vehicle 10 is in a state of waiting to receive a movement control execution instruction for the remote parking (specification in which the automatic stop mode cannot be disabled by the user operation), it is possible to prevent a situation in which no driving operation in the vehicle 10 can be performed until the vehicle 10 is restarted. For this reason, a burden on the user M can be reduced. Further, when the automatic stop mode is disabled before the state of waiting to receive a movement control execution instruction for the remote parking, for example, it is possible to receive a stop operation for the remote parking and stop the remote parking.

Second Operation Example

In a second operation example, an operation when a driving operation is performed in the vehicle 10 in the enabled automatic stop mode will be described.

FIG. 13 is a sequence diagram showing the second operation example of the vehicle 10 and the information terminal 60. In the second operation example, steps S11 to S24 are the same as steps S11 to S24 shown in FIGS. 6 and 7. It is assumed that, after the automatic stop mode is enabled in step S23 and the stop button 91 for the remote parking is hidden in step S24, the user M who intends to perform the remote parking changes his or her mind and returns to inside the vehicle 10 to perform a normal driving operation (shift lever operation or the like). The vehicle 10 detects the driving operation by the user M from inside the vehicle (step S31).

Next, the vehicle 10 displays a restart guide screen on the touch panel 42 of the navigation device 18 (step S32). Examples of the restart guide screen include a guide screen 101 shown in FIG. 14. The guide screen 101 includes a message such as "A RESTART IS NECESSARY" and an image indicating an operation for the restart. In this example, the image indicating an operation for the restart is an image indicating an operation of first pressing an ignition button to turn off the ignition and then pressing the ignition button again while pressing the brake pedal to turn on the ignition.

Next, the vehicle 10 detects an ignition off operation (pressing of ignition button) from inside the vehicle (step S33). Next, the vehicle 10 turns off the ignition (driving stops) (step S34). At this time, the vehicle 10 disables the automatic stop mode enabled in step S23.

Next, the vehicle 10 detects an ignition on operation (re-pressing the ignition button) from inside the vehicle (step S35). Next, the vehicle 10 turns on the ignition (driving restarts) (step S36). Accordingly, the restart of the vehicle 10 is completed, and the automatic stop mode is disabled. Accordingly, the driving operation from inside the vehicle is possible.

As described above, when the control ECU 20 is in the state of waiting to receive a movement control execution instruction from outside the vehicle 10 by the information terminal 60 of the user M of the vehicle 10, the control ECU 20 enables the automatic stop mode in which the driving of the vehicle 10 is automatically stopped based on the completion of the movement control, and keeps the automatic stop mode enabled until the driving of the vehicle 10 is stopped. When the automatic stop mode is disabled, the control ECU 20 receives a stop operation for the movement control, and when the automatic stop mode is enabled, the control ECU 20 receives no stop operation for the movement control.

Accordingly, even in a specification in which the automatic stop mode is kept enabled until the driving of the vehicle 10 is stopped after the vehicle 10 is in a state of waiting to receive a movement control execution instruction from outside (specification in which the automatic stop mode cannot be disabled by the user operation), it is possible to prevent a situation in which no driving operation in the vehicle 10 can be performed until the vehicle 10 is restarted. For this reason, a burden on the user M can be reduced. In addition, when the automatic stop mode is disabled before the state of waiting to receive the movement control execution instruction from outside, for example, it is possible to receive a stop operation for movement control and stop the movement control.

In addition, the control ECU 20 may enable the automatic stop mode when the control ECU 20 is in a state of waiting to receive the movement control execution instruction from outside and the opening and closing state of the door of the vehicle 10 is an opening state (door opening). Accordingly, for example, when the vehicle 10 is in a state of waiting to receive the movement control execution instruction from outside and the user M changes his or her mind before opening the door and attempts to perform a stop operation for movement control in the vehicle, the automatic stop mode is not enabled, and thus the stop operation for movement control can be received.

When the control ECU 20 detects the driving operation from inside the vehicle 10 in a state of receiving no stop operation for movement control since the automatic stop mode is enabled, the control ECU 20 performs the operation guide (display the guide screen 101) for enabling the driving operation. Accordingly, even in a state of receiving no stop operation for movement control since the automatic stop mode is enabled, it is possible to guide a safe operation for enabling the driving operation.

In addition, when receiving a ready instruction (for example, agreement answer information) for movement control from the information terminal 60, the control ECU 20 gives a notification for prompting the user M to move to outside the vehicle 10 and give the movement control execution instruction (operation to execute movement control). The notification for prompting the user M to move to outside the vehicle 10 is, for example, display of an alighting guide screen on the information terminal 60 by transmission of the above-described alighting guide information. The notification for prompting the user M to give a movement control execution instruction (operation to execute movement control) is, for example, display of the reception screen 67 (particularly, the guide message 67b) on the information terminal 60 by transmission of a display instruction for a reception screen for the movement control execution instruction. Accordingly, the user M can easily grasp a procedure of alighting from the vehicle and performing a movement control execution instruction from outside the vehicle. The notification for prompting the user M to move to outside the vehicle 10 and the notification for prompting the user M to give a movement control execution instruction may be given at the same time.

First Modification

FIG. 15 is a sequence diagram showing a first modification of the vehicle 10 and the information terminal 60. In the first modification, steps S11 to S17 are the same as steps S11 to S17 shown in FIGS. 6 and 7. In this example, it is assumed that the information terminal that transmits the agreement answer information in response to the inquiry information transmitted from the vehicle 10 is not the information terminal 60 carried by the user M in the vehicle 10 but an information terminal 60B carried by a user outside the vehicle 10.

The vehicle 10 determines whether the information terminal 60B that transmits the agreement answer information in step S17 is located inside the vehicle 10. The determination is performed, for example, based on a reception intensity from the information terminal 60B in the vehicle 10 that is obtained by communication between the vehicle 10 and the information terminal 60B. The determination may also be performed based on an estimated position or the like of the information terminal 60B that is obtained by communication between the vehicle 10 and the information terminal 60B.

In this example, the vehicle 10 determines that the information terminal 60B is located outside the vehicle 10 (outside the vehicle). In this case, the vehicle 10 does not give the notification for prompting the user M to move to outside the vehicle 10 (for example, display of the alighting guide screen on the information terminal 60 by the transmission of the alighting guide information) or the notification for prompting the user M to give a movement control execution instruction for remote parking (for example, display of the reception screen 67 on the information terminal 60 by the transmission of the display instruction for the reception screen for the movement control execution instruction). Accordingly, when an unauthorized user who is not an authorized user (driver) who can instruct remote parking of the vehicle 10 intentionally or unintentionally gives a disclaimer agreement or the like with the information terminal 60B and transmits agreement answer information to the vehicle 10, it is possible to prevent the authorized user in the vehicle 10 from unintentionally alighting from the vehicle 10 and unintentionally performing a movement control execution instruction in the vehicle 10.

In this case, the vehicle 10 does not execute the movement control of remote parking even when receiving the movement control execution instruction for remote parking. Accordingly, the vehicle 10 can be prevented from executing the movement control of remote parking when the unauthorized user intentionally or unintentionally performs the movement control with the information terminal 60B and transmits the movement control execution instruction to the vehicle 10.

Second Modification

FIG. 16 is a sequence diagram showing a second modification of the vehicle 10 and the information terminal 60. In the second modification, steps S11 to S17 are the same as steps S11 to S17 shown in FIGS. 6 and 7. In this example, it is assumed that the information terminal that transmits the agreement answer information in response to the inquiry information transmitted from the vehicle 10 is not the information terminal 60 carried by the user M in the vehicle 10 but an information terminal 60C carried by an unauthorized user different from the user M in the vehicle 10.

The vehicle 10 determines whether the information terminal 60C that transmits the agreement answer information in step S17 is an information terminal of an authorized user of the vehicle 10. The determination is performed, for example, based on a comparison between identification information on the information terminal of the authorized user of the vehicle 10 and identification information on the information terminal 60C. The information terminal of the authorized user of the vehicle 10 is registered in advance by, for example, a registration operation. In addition, the vehicle 10 may register an information terminal associated with the user in the vehicle 10 in advance as the information terminal of the authorized user by authentication (for example, biometric authentication) of the user in the vehicle 10. The user in the vehicle 10 may be limited to the user in a driver seat of the vehicle 10.

In this example, the vehicle 10 determines that the information terminal 60C is not the information terminal of the authorized user (unauthorized user). In this case, the vehicle 10 does not give the notification for prompting the user to move to outside the vehicle 10 (for example, display of the alighting guide screen on the information terminal 60 by the transmission of the alighting guide information) or the notification for prompting the user to give the movement control execution instruction for remote parking (for example, display of the reception screen 67 on the information terminal 60 by the transmission of the display instruction for the reception screen for the movement control execution instruction). Accordingly, when the unauthorized user intentionally or unintentionally gives a disclaimer agreement or the like with the information terminal 60C and transmits agreement answer information to the vehicle 10, it is possible to prevent the authorized user in the vehicle 10 from unintentionally alighting from the vehicle 10 and unintentionally performing a movement control execution instruction in the vehicle 10.

In this case, the vehicle 10 does not execute the movement control of remote parking even when receiving the movement control execution instruction for remote parking. Accordingly, the vehicle 10 can be prevented from executing the movement control of remote parking when the unauthorized user intentionally or unintentionally executes the movement control with the information terminal 60C and transmits the movement control execution instruction to the vehicle 10.

Although the embodiment of the present disclosure is described above, the present disclosure is not limited to the above embodiment and may be modified, improved, and the like as appropriate.

For example, in the above-described embodiment, the control of hiding the stop button 91 is described as an example of the control of receiving no stop operation for movement control when the automatic stop mode is enabled. Alternatively, the control of receiving no stop operation for movement control is not limited thereto. For example, the control of receiving no stop operation for movement control may be control of not stopping the movement control even when the stop button 91 is pressed by graying out the stop button 91 or the like, or may be control of not stopping the movement control even when the stop button 91 is pressed without changing an appearance of the stop button 91.

In the above-described embodiment, the pressing of the stop button 91 displayed on the touch panel 42 is described as an example of a stop operation for movement control. Alternatively, the stop operation for movement control may be pressing of a button displayed on the information terminal 60 or audio operation by audio recognition.

In the above-described embodiment, the display of the guide screen 101 by the touch panel 42 is described as an example of the operation guide for enabling the driving operation. Alternatively, the operation guide for enabling the driving operation is not limited thereto. For example, the operation guide for enabling the driving operation may be performed by screen display of the information terminal 60, or by audio output from the speaker 44 of the navigation device 18 or a speaker of the information terminal 60.

In the above-described embodiment, the display of the alighting guide screen on the information terminal 60 by the transmission of the alighting guide information is described as an example of the notification for prompting the user M to move to outside the vehicle 10. Alternatively, the notification for prompting the user M to move to outside the vehicle 10 is not limited thereto. For example, the notification for prompting the user M to move to outside the vehicle 10 may be performed by screen display by the touch panel 42 of the navigation device 18, or by audio output by the speaker 44 of the navigation device 18 or the speaker of the information terminal 60.

In the above-described embodiment, the reception screen 67 (particularly, the guide message 67b) is displayed on the information terminal 60 by transmitting the display instruction for the reception screen for the movement control execution instruction as an example of the notification for prompting the user M to give the movement control execution instruction. Alternatively, the notification for prompting the user M to give the movement control execution instruction is not limited thereto. For example, the notification for prompting the user M to give the movement control execution instruction may be given by screen display by the touch panel 42 of the navigation device 18, or by audio output by the speaker 44 of the navigation device 18 or the speaker of the information terminal 60.

The above embodiment described a case in which direct communication is performed between the vehicle 10 and the information terminal 60 when the movement control unit 56 of the vehicle 10 performs communication with the information terminal 60 of the user M. Alternatively, the communication is not limited thereto. For example, the movement control unit 56 may communicate with the information terminal 60 carried by the user M via a smart key of the user M.

The above embodiment described an example in which the moving body is a vehicle (four-wheeled automobile). Alternatively, the present disclosure is not limited thereto. For example, the moving body may be a motorcycle or a Segway. Further, the idea of the present disclosure is not limited to the vehicle, and may also be applied to a robot, a ship, an aircraft, or the like that includes a drive source and is movable by power of the drive source.

The control method described in the above-described embodiment can be implemented by executing a control program prepared in advance by a computer. The control program is stored in a computer-readable storage medium and executed by being read from the storage medium. The control program may be provided in a form of being stored in a non-transitory storage medium such as a flash memory, or may be provided via a network such as the Internet. The computer that executes the control program may be provided in a control device, an electronic device such as a smartphone, a tablet terminal, or a personal computer that can communicate with a control device, or a server device that can communicate with a control device and an electronic device.

The present specification at least discloses the following matters. Corresponding components or the like in the above-described embodiment are shown in parentheses, and the present disclosure is not limited thereto.

(1) A control device (control ECU 20) for a moving body (vehicle 10), the device includes:

a reception circuit (reception unit 55) configured to receive a movement control execution instruction from outside the moving body by a terminal (information terminal 60) of a user (user M) of the moving body;

a movement controller (movement control unit 56) configured to perform movement control of the moving body based on the movement control execution instruction and stop the movement control based on a stop operation for the movement control; and a drive controller (drive control unit 57) configured to set an automatic stop mode in which driving of the moving body is automatically stopped based on completion of the movement control, in which the drive controller enables the automatic stop mode when the moving body is in a state of waiting to receive the movement control execution instruction, and keeps the automatic stop mode enabled until the driving of the moving body is stopped, and the movement controller receives the stop operation when the automatic stop mode is disabled and receives no stop operation when the automatic stop mode is enabled.

According to (1), no stop operation for the movement control is received when the automatic stop mode is enabled. Accordingly, even in a specification in which the automatic stop mode is kept enabled until the driving of the moving body is stopped after the moving body is in a state of waiting to receive a movement control execution instruction from outside (specification in which the automatic stop mode cannot be disabled by the user operation), it is possible to prevent a situation in which no driving operation in the moving body can be performed until the moving body is restarted. For this reason, a burden on the user can be reduced.

(2) In the control device according to (1), the drive controller enables the automatic stop mode when the moving body is in the state of waiting to receive the movement control execution instruction and an opening and closing state of a door of the moving body is an opening state, and keeps the automatic stop mode enabled until the driving of the moving body is stopped.

According to (2), it is possible to enable the automatic stop mode in a state (opening state) in which the movement control execution instruction is available from outside the moving body, and thereafter keep the automatic stop mode enabled until the driving of the moving body is stopped. Accordingly, for example, when the moving body is in the state of waiting to receive the movement control execution instruction and the user changes his or her mind before opening the door and attempts to perform the stop operation for the movement control in the moving body, the automatic stop mode is not enabled, and thus the stop operation for the movement control can be received.

(3) In the control device according to (1) or (2), the movement controller performs operation guide for enabling a driving operation from inside the moving body when the driving operation is detected in a state of receiving no stop operation due to the enabled automatic stop mode.

According to (3), even in the state of receiving no stop operation for the movement control due to the enabled automatic stop mode, it is possible to guide a safe operation for enabling the driving operation.

(4) In the control device according to any one of (1) to (3), the drive controller disables the automatic stop mode when the driving of the moving body is automatically stopped by the automatic stop mode.

According to (4), when the driving of the moving body is automatically stopped by the automatic stop mode and then the driving of the moving body is restarted, it is possible to prevent a situation in which the automatic stop mode remains enabled and the moving body is unintentionally operated.

(5) In the control device according to any one of (1) to (4), when a ready instruction for the movement control is received from a terminal, the movement controller gives a notification for prompting the user to move to outside the moving body and to give the movement control execution instruction.

According to (5), the user can easily grasp a procedure of alighting from the vehicle and performing a movement control execution instruction from outside the vehicle.

(6) In the control device according to (5), the movement controller does not give the notification for prompting the user to move to outside the moving body and to give the movement control execution instruction when the terminal that gives the ready instruction for the movement control is located outside the moving body.

According to (6), when an unauthorized user intentionally or unintentionally gives a ready instruction for the movement control, it is possible to prevent the authorized user in the moving body from unintentionally alighting from the moving body and unintentionally performing a movement control execution instruction in the moving body.

(7) In the control device according to (5) or (6), the movement controller does not give the notification for prompting the user to move to outside the moving body and to give the movement control execution instruction when the terminal that gives the ready instruction for the movement control is not the terminal of the user.

According to (7), when an unauthorized user intentionally or unintentionally gives a ready instruction for the movement control, it is possible to prevent the authorized user in the moving body from unintentionally alighting from the moving body and unintentionally performing a movement control execution instruction in the moving body.

(8) In the control device according to any one of (1) to (7), the movement controller does not execute the movement control when the terminal that gives the ready instruction for the movement control is located outside the moving body.

According to (8), it is possible to prevent the moving body from executing the movement control when an unauthorized user intentionally or unintentionally performs the movement control or the like.

(9) In the control device according to any one of (1) to (8), the movement controller does not execute the movement control when the terminal that gives the ready instruction for the movement control is not the terminal of the user.

According to (9), it is possible to prevent the moving body from executing the movement control when an unauthorized user intentionally or unintentionally performs the movement control or the like.

(10) A control method by a control device, the control device being configured to receive a movement control execution instruction from outside a moving body by a terminal of a user of the moving body, perform movement control of the moving body based on the movement control execution instruction and stop the movement control based on a stop operation for the movement control, and set an automatic stop mode in which driving of the moving body is automatically stopped based on completion of the movement control, the method includes:

enabling the automatic stop mode when the moving body is in a state of waiting to receive the movement control execution instruction, and keeping the automatic stop mode enabled until the driving of the moving body is stopped; and receiving the stop operation when the automatic stop mode is disabled and receiving no stop operation when the automatic stop mode is enabled.

According to (10), no stop operation for the movement control is received when the automatic stop mode is enabled. Accordingly, even in a specification in which the automatic stop mode is kept enabled until the driving of the moving body is stopped after the moving body is in a state of waiting to receive a movement control execution instruction from outside (specification in which the automatic stop mode cannot be disabled by the user operation), it is possible to prevent a situation in which no driving operation in the moving body can be performed until the moving body is restarted. For this reason, a burden on the user can be reduced.

(11) A control program of a control device, the control device being configured to receive a movement control execution instruction from outside a moving body by a terminal of a user of the moving body, perform movement control of the moving body based on the movement control execution instruction and stop the movement control based on a stop operation for the movement control, and set an automatic stop mode in which driving of the moving body is automatically stopped based on completion of the movement control, the program causes a processor of the control device to:

enable the automatic stop mode when the moving body is in a state of waiting to receive the movement control execution instruction, and kept the automatic stop mode enabled until the driving of the moving body is stopped; and receive the stop operation when the automatic stop mode is disabled and receive no stop operation when the automatic stop mode is enabled.

According to (11), no stop operation for the movement control is received when the automatic stop mode is enabled. Accordingly, even in a specification in which the automatic stop mode is kept enabled until the driving of the moving body is stopped after the moving body is in a state of waiting to receive a movement control execution instruction from outside (specification in which the automatic stop mode cannot be disabled by the user operation), it is possible to prevent a situation in which no driving operation in the moving body can be performed until the moving body is restarted. For this reason, a burden on the user can be reduced.

The invention claimed is:

1. A control device for a moving body, the device comprising:

a reception circuit configured to receive a movement control execution instruction from outside the moving body by a terminal of a user of the moving body;

a movement controller configured to perform movement control of the moving body based on the movement control execution instruction and stop the movement control based on a stop operation for the movement control; and a drive controller configured to set an automatic stop mode in which driving of the moving body is automatically stopped based on completion of the movement control, wherein the drive controller enables the automatic stop mode when the moving body is in a state of waiting to receive the movement control execution instruction, and keeps the automatic stop mode enabled until the driving of the moving body is stopped, and the movement controller receives the stop operation when the automatic stop mode is disabled and receives no stop operation when the automatic stop mode is enabled.

2. The control device according to claim 1, wherein the drive controller enables the automatic stop mode when the moving body is in the state of waiting to receive the movement control execution instruction and an opening and closing state of a door of the moving body is an opening state, and keeps the automatic stop mode enabled until the driving of the moving body is stopped.

3. The control device according to claim 1, wherein the movement controller performs operation guide for enabling a driving operation from inside the moving body when the driving operation is detected in a state of receiving no stop operation due to the enabled automatic stop mode.

4. The control device according to claim 1, wherein the drive controller disables the automatic stop mode when the driving of the moving body is automatically stopped by the automatic stop mode.

5. The control device according to claim 1, wherein when a ready instruction for the movement control is received from a terminal, the movement controller gives a notification for prompting the user to move to outside the moving body and to give the movement control execution instruction.

6. The control device according to claim 5, wherein the movement controller does not give the notification for prompting the user to move to outside the moving body and to give the movement control execution instruction when the terminal that gives the ready instruction for the movement control is located outside the moving body.

7. The control device according to claim 5, wherein the movement controller does not give the notification for prompting the user to move to outside the moving body and to give the movement control execution instruction when the terminal that gives the ready instruction for the movement control is not the terminal of the user.

8. The control device according to claim 1, wherein the movement controller does not execute the movement control when the terminal that gives a ready instruction for the movement control is located outside the moving body.

9. The control device according to claim 1, wherein the movement controller does not execute the movement control when the terminal that gives a ready instruction for the movement control is not the terminal of the user.

10. A control method by a control device, wherein the control device is configured to receive a movement control execution instruction from outside a moving body by a terminal of a user of the moving body, perform movement control of the moving body based on the movement control execution instruction and stop the movement control based on a stop operation for the movement control, and set an automatic stop mode in which driving of the moving body is automatically stopped based on completion of the movement control, and the method comprises: enabling the automatic stop mode when the moving body is in a state of waiting to receive the movement control execution instruction, and keeping the automatic stop mode enabled until the driving of the moving body is stopped; and receiving the stop operation when the automatic stop mode is disabled and receiving no stop operation when the automatic stop mode is enabled.

11. A computer-readable non-transitory storage medium storing a control program for causing a control device to execute a process, wherein the control device is configured to receive a movement control execution instruction from outside a moving body by a terminal of a user of the moving body, perform movement control of the moving body based on the movement control execution instruction and stop the movement control based on a stop operation for the movement control, and set an automatic stop mode in which driving of the moving body is automatically stopped based on completion of the movement control, and the process comprises:

enabling the automatic stop mode when the moving body is in a state of waiting to receive the movement control execution instruction, and keep the automatic stop mode enabled until the driving of the moving body is stopped; and receiving the stop operation when the automatic stop mode is disabled and receive no stop operation when the automatic stop mode is enabled.

\* \* \* \* \*